(12) United States Patent
Dutta et al.

(10) Patent No.: US 10,545,869 B2
(45) Date of Patent: Jan. 28, 2020

(54) POWER BUTTON OVERRIDE FOR PERSISTENT MEMORY ENABLED PLATFORMS

(71) Applicant: Intel Corporation, Santa Clara, CA (US)

(72) Inventors: Pronay Dutta, Portland, OR (US); Christopher Lake, Folsom, CA (US); Patrick James, Beaverton, OR (US); Paul Crutcher, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,672

(22) Filed: Jun. 29, 2018

(65) Prior Publication Data

US 2019/0042418 A1 Feb. 7, 2019

(51) Int. Cl.
*G06F 12/08* (2016.01)
*G06F 1/3296* (2019.01)
*G06F 9/4401* (2018.01)
*G06F 12/0804* (2016.01)

(52) U.S. Cl.
CPC ........ *G06F 12/0804* (2013.01); *G06F 1/3296* (2013.01); *G06F 9/442* (2013.01); *G06F 2212/1032* (2013.01)

(58) Field of Classification Search
None
See application file for complete search history.

(56) References Cited

U.S. PATENT DOCUMENTS

| | | | | |
|---|---|---|---|---|
| 9,060,089 | B2* | 6/2015 | Maruhashi | H04N 1/00896 |
| 2006/0090090 | A1* | 4/2006 | Perng | G06F 1/24 |
| | | | | 713/320 |
| 2007/0101077 | A1* | 5/2007 | Evanchik | G06F 9/4418 |
| | | | | 711/162 |
| 2008/0168290 | A1* | 7/2008 | Jobs | G06F 1/26 |
| | | | | 713/324 |
| 2011/0231639 | A1* | 9/2011 | Chien | G06F 1/26 |
| | | | | 713/2 |
| 2012/0144178 | A1* | 6/2012 | Iyigun | G06F 9/4418 |
| | | | | 713/2 |
| 2012/0191990 | A1* | 7/2012 | Hodge | G06F 1/3203 |
| | | | | 713/300 |
| 2014/0380032 | A1* | 12/2014 | Takahashi | G06F 1/26 |
| | | | | 713/2 |
| 2018/0300239 | A1* | 10/2018 | Hsu | G06F 12/0804 |
| 2019/0129836 | A1* | 5/2019 | Boyle | G06F 12/0246 |

FOREIGN PATENT DOCUMENTS

WO 1997-288875 * 5/1997

* cited by examiner

*Primary Examiner* — Kaushikkumar M Patel
(74) *Attorney, Agent, or Firm* — Compass IP Law PC

(57) ABSTRACT

A power button override allows a persistent memory enabled platform to preserve data in persistent memory before initiating shutdown in a manner that is transparent to the user. The power button override prevents shutdown until all of the volatile cache and any other data in the platform has been flushed to persistent memory.

10 Claims, 4 Drawing Sheets

POWER BUTTON OVERRIDE FOR PERSISTENT MEMORY ENABLED PLATFORMS

TECHNICAL FIELD

The technical field relates generally to computer system memory, and in particular to persistent memory enabled platforms.

BACKGROUND

In a typical computer system configured with volatile memory and storage, data needs to be read into the memory before it can be made available to applications. Similarly, modified data needs to be saved back into storage to avoid any data loss.

To achieve greater performance many computer systems are equipped with persistent memory, a type of memory that does not lose state during a power cycle. The use of persistent memory results in significant performance improvements and responsiveness by eliminating the need to read the data into the memory before making it available to an application, and also by eliminating the need to save memory content back to a storage device before the system powers off.

BRIEF DESCRIPTION OF THE DRAWINGS

The described embodiments are illustrated by way of example and not limitation in the figures of the accompanying drawings, in which like references indicate similar elements and in which.

Figure 1:
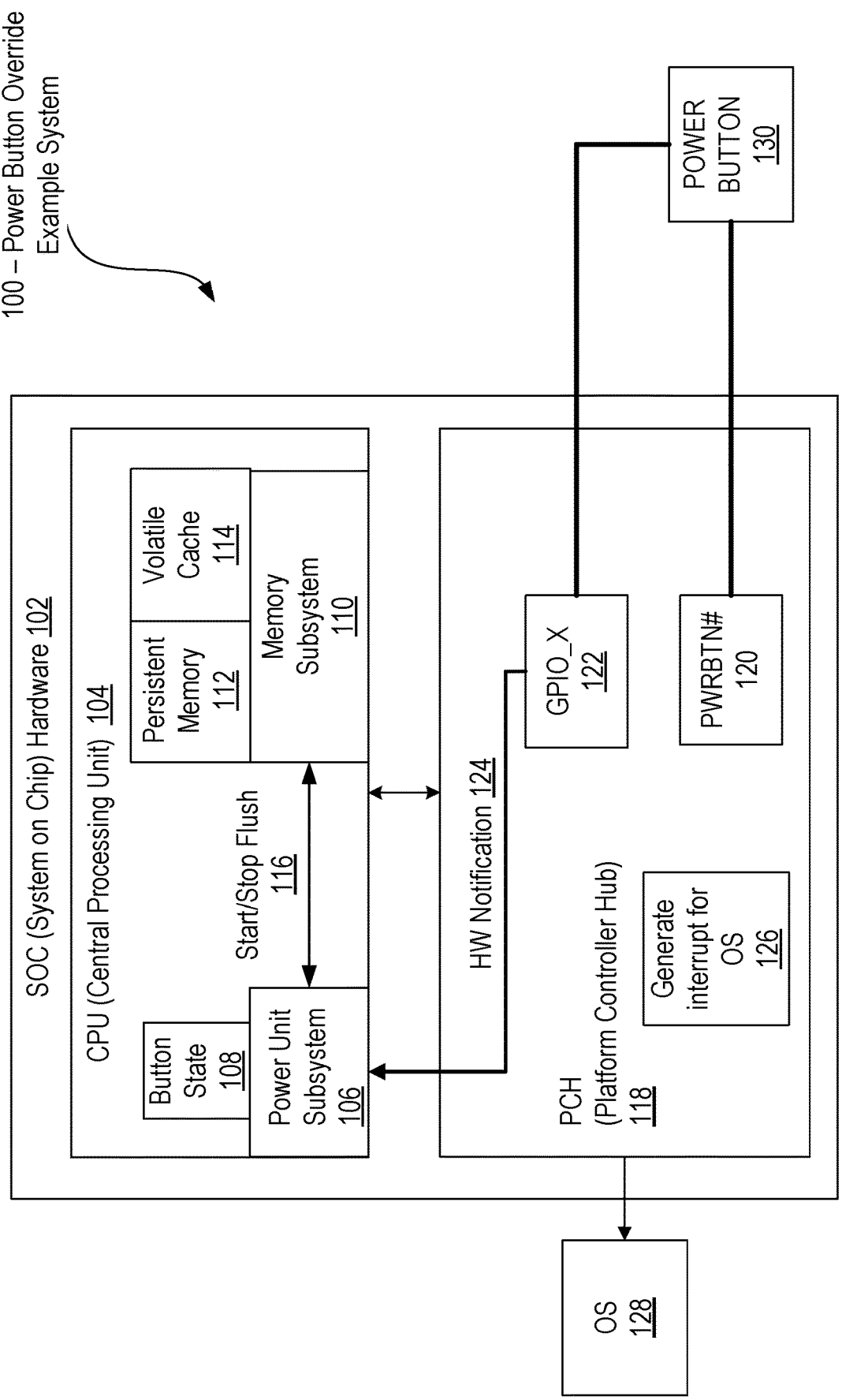
FIG. 1 is a simplified block diagram of an example persistent memory enabled system in which a power button override process can be implemented in accordance with various examples described herein.

Other features of the described embodiments will be apparent from the accompanying drawings and from the detailed description that follows.

DESCRIPTION OF THE EMBODIMENTS

Demand for persistent memory enabled computer systems is growing. For example, persistent memory solutions are crucial for 3DXP memory systems and various end user applications, such as competitive video gaming, booting from persistent memory and "instant on" applications. Pressing and holding the power button is often used by end users to force the system to power down ungracefully. File system corruption or significant data loss for this common scenario could jeopardize persistent memory solutions for end user products.

To achieve the performance and responsiveness for system on a chip (SOC) designed with persistent memory, it is required that there is both a significant amount of volatile cache with high bandwidth capability along with the non-volatile persistent memory to guarantee performance and responsiveness of a persistent memory enabled system. For example, a typical persistent memory solution includes a minimum of 8 GB of volatile memory cache. The volatile cache is managed by the SOC hardware (HW) and is transparent to the operating system (OS) and applications.

For any persistent memory enabled platform, the durability of the end user's data and file system in the event of a power loss or ungraceful shutdown is of paramount importance. For this reason, a typical computer system with persistent memory is equipped with a backup battery to avoid any data loss caused by an alternating current (AC) power loss. Nevertheless, the durability of the data and file system are still at risk when the system shuts down ungracefully or loses power without battery backup.

One mechanism to force the system to shut down ungracefully is to hold the power button down for a period of time, such as 10 seconds. This typically occurs when a computer system or the OS is not responsive, the OS has crashed, and the user manually powers down the system by pressing the power button in an effort to recover the system. In a typical computer system, pressing the power button for a period of time will force the system to shut down ungracefully, bypassing any data integrity mechanisms.

While bypassing data integrity mechanisms is usually sufficient in a computer system that has a standard memory configuration, in a persistent memory system any data residing in the volatile cache memory or CPU cache before it is flushed out to non-volatile persistent memory will be lost. The amount of data lost can vary depending on caching policy and how often data is flushed out to persistent memory, but it can be significant, even as high as a few Gigabytes.

Moreover, bypassing data integrity mechanisms in a persistent memory enabled platform can cause not only loss of user data but can also cause file system corruption. For this reason, a persistent memory enabled platform relying on a large volatile memory cache is not attractive to customers or end-users.

To address these challenges and avoid or minimize data loss caused by an ungraceful shutdown, a power button override for persistent memory enabled platforms causes a memory subsystem to flush data from any one or more of a central processor unit (CPU) cache and volatile memory cache to persistent memory before initiating shutdown.

In one embodiment, a system on a chip (SoC) hardware (HW) detects a power button press and immediately monitors a state of the power button, such as by setting a timer and recursively checking the state of the power button until it changes (e.g., is released) or the timer expires. A typical duration for pressing the power button before forcing a system shutdown is ten seconds, referred to herein as any of a power button cycle, timeout or threshold. In one embodiment, a system can be configured to use other durations of the power button cycle as long as the duration allows sufficient time to initiate the flushing of data to persistent memory before shutdown is commenced.

In one embodiment, if the power button is pressed for two seconds (or other portion of the duration of the power button cycle) then the SoC HW performs an early handshake to trigger the persistent memory subsystem to flush any of the user and file system data from the CPU cache and volatile memory cache to persistent memory before shutdown commences. For example, if the power button cycle is ten seconds, the early handshake provides the persistent memory subsystem with the remaining eight seconds of the power button cycle to flush data before the system begins to shut down.

In one embodiment, the SoC HW performs the early handshake with the persistent memory subsystem as part of the shutdown flow to ensure that any remaining dirty pages will be flushed before system powers down the memory subsystem. In one embodiment, if the software OS is still operational, then the software can perform the new handshake with the persistent memory subsystem to assist in the orderly flushing of dirty pages before the system begins to shut down.

In one embodiment, if the power button is released any time before the power button override timeout expires (e.g. before the expiration of ten seconds), then the SoC HW terminates the persistent memory flush and normal operation will continue.

In one embodiment the data to be flushed includes any data in the volatile cache marked as "dirty," which refers to data that has been changed in volatile cache but is not yet changed in persistent memory or storage.

In one embodiment, monitoring the power button state at an early stage prior to shutdown allows the SOC HW to provide greater durability of data without changing the user's experience of using the power button to shut down a system. For example, without the benefit of the power button override monitoring an additional eight seconds of unnecessary delay would occur before performing the handshake with the persistent memory subsystem. The power button override monitoring avoids the unnecessary delay, minimizes the possibility that the flush of data to persistent memory would be incomplete when power was removed resulting in lost data or possible file system corruption during an ungraceful shutdown, while still preserving the user's experience of using the power button to initiate a shutdown of the user's system.

In the description that follows, examples may include subject matter such as a method, a process, a means for performing acts of the method or process, an apparatus, a memory device, and a system for a power button override for persistent memory enabled platforms, and at least one machine-readable tangible storage medium including instructions that, when performed by a machine or processor, cause the machine or processor to performs acts of the method or process according to embodiments and examples described herein Numerous specific details are set forth to provide a thorough explanation of embodiments of the methods, media and systems for providing a power button override for persistent memory enabled platforms. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the processes and logic are described below in terms of some sequential operations, it should be appreciated that some of the operations described can be performed in a different order. Moreover, some operations can be performed in parallel rather than sequentially.

In any one or more of the embodiments of the systems, apparatuses and methods for a power button override for persistent memory enabled platforms, means for performing any one or more of the systems, apparatuses and methods is herein described.

In any one or more of the embodiments of the systems, apparatuses and methods for a power button override for persistent memory enabled platforms, at least one computer-readable storage medium includes instructions that, when executed on one or more processors of a computer system cause the processor(s) to perform any one or more of the embodiments of the systems, apparatuses and methods herein described.

FIG. 1 is a simplified block diagram of an example power button override system 100 for persistent memory enabled platforms implemented in accordance with various examples described herein. Referring to FIG. 1, by way of example only and not limitation, in one embodiment a system on a chip (SOC) hardware (HW) 102 includes at least one central processing unit (CPU) complex 104 providing a power unit subsystem 106 for monitoring a power button state 108 and performing a power button override logic to preserve data in persistent memory 112. For example, the power unit subsystem 106 can be a power management controller (Punit) in the CPU 104 complex that monitors the power button state based on a HW notification 124 received from a platform controller hub (PCH) 118.

In one embodiment, in a system 100 compliant with the Advanced Configuration and Power Interface (ACPI) system supporting an S3 sleep state of standby, sleep or suspend to random access memory (RAM), in which RAM remains powered, a power button 130 is connected to PWRBTN# pin 120 on the SOC 102.

In a system 100 that employs either an ACPI-S3 compliant system or system with Modern Standby power management, in which the transition into and out of a lower power state is faster than an ACPI-S3 system, the PCH includes logic to generate an interrupt 126 indicating the power button status to an OS 128 performed in the CPU 104 as the power level changes. In one embodiment, the OS 128 uses the interrupt 126 to begin working with the memory subsystem 110 to flush any dirty pages in the OS to persistent memory 112 independently of power unit subsystem 106. In this manner the OS 128 can assist with any flushing initiated by the power unit subsystem 106 performing the power button override logic as described in further detail below.

For either an ACPI-S3 or Modern Standby system, in embodiments of a system 100 for providing a power button override for persistent memory enabled storage, the power button 130 is connected to an additional GPIO pin, referenced herein as GPIO_X 122. The GPIO_X pin 122 generates a HW notification 124 to the CPU complex 104 containing the current state of the power button 130, i.e. released or pressed, or activated/deactivated, and the HW notification 124 is received in the power unit subsystem 106, also referred to herein as the Power Management Controller (Punit).

In one embodiment, both the GPIO_X and PWRBTN# pins are special purpose pins integrated in the PCH die. The GPIO_X is a special purpose GPIO pin that can generate a notification from PCH 118 to the power unit subsystem 106 in the CPU complex 104 with the information on the state of the GPIO_X (down or up). The PWRBTN# pin is a special pin that provides power button behavior on the SOC 102 including a hard shutdown after an override timer expires. The PWRBTN# can also generate an interrupt 126 to OS 128 when power button is pressed.

In one embodiment, the power unit subsystem 106 in the CPU complex 104 monitors a power button state 108 based on the HW notification 124 from PCH 118 as generated by the GPIO_X pin 122 directly from the power button 130 In one embodiment the power unit subsystem 106 monitors the power button state 108 based on a configurable timeout value previously communicated to the CPU complex 104 and/or provided in the HW notification 124.

In one embodiment, the timeout value is referred to herein as the power button cycle duration. By way of example only and not limitation, the power button cycle duration is described in the example embodiments as a duration of ten seconds. However other longer or shorter durations may be used as long as there is sufficient amount of time to trigger the memory subsystem 110 to flush data and state information to persistent memory 112 where that data and state information would otherwise be lost prior to shutdown.

During operation, if the power button 130 is pressed until the timeout value is reached, i.e. for the entire ten seconds of the power button cycle duration, then the SOC HW 102 will trigger a hard reset. In one embodiment, if the OS 128 is still functional, upon receiving an interrupt 126 indicating that the power button has been activated, such as might be available in a Modern Standby system, then the OS can trigger the memory subsystem 110 to begin flushing the OS's data and state information to persistent memory 112 independently of the power unit subsystem 106 and without waiting for any timeout of the power button override cycle.

In one embodiment, prior to expiration of the timeout value, power button override monitoring for persistent memory enabled platforms further monitors the power button cycle duration in order to trigger the memory subsystem to begin flushing dirty pages from the CPU complex 104 and volatile cache memory 114 to persistent memory 112. For example, in one embodiment, the power unit subsystem 106 performs power button override monitoring to determine when an initial amount of the timeout value has elapsed, such as two seconds of a ten second power button override cycle duration. Upon expiration of the initial amount of two seconds, the power unit subsystem 106 triggers the memory subsystem 110 to start flushing 116. In response, the memory subsystem 110 notifies the CPU complex 104 via the power unit subsystem 106 when flushing is complete to enable the shutdown to proceed. In most cases, the memory subsystem 110 should have sufficient time between the expiration of the initial amount of two seconds and the final expiration of ten seconds to flush all or most of the data to persistent memory 112 prior to shutdown.

In one embodiment, should the memory subsystem 110 not have sufficient time between the expiration of the initial amount of two seconds and the final expiration of ten seconds to flush all or most of the data to persistent memory 112, the power management unit 106 can initiate the power button override to delay the shutdown process until the return of the start flushing notification 116 is received from the memory subsystem 110 indicating that flushing to persistent memory 112 is complete.

In a typical embodiment, caching policy of the memory subsystem 110 will insure that the maximum limit of dirty data kept in volatile cache is of a size capable of being flushed during a typical power button override cycle, e.g. during the last eight seconds of a ten second power button override cycle. In one embodiment, the caching policy can be supplemented with a configurable additional time limit that the power unit subsystem 106 can use to delay shutdown beyond the standard power button override cycle, e.g. beyond the last eight seconds of a ten second power button override cycle. This additional time limit can be used by the power unit subsystem 106 to further delay shutdown until the flushing of volatile cache to persistent storage is completed. If the memory subsystem 110 does not complete flushing within this additional time limit, then, in one embodiment, the power unit subsystem 106 notifies the memory subsystem 110 to stop flushing. The configured additional time limit can be 0 seconds or an amount of time beyond the expiration of full amount of the power button override cycle, e.g., an additional ten seconds, so as not to delay shutdown. For example, in some cases, such as when the amount of data in volatile cache memory 114 is particularly large, there could be an insufficient amount of time in the default power button override cycle duration to complete flushing operations, and the additional time limit can be configured for example, for ten more seconds In one embodiment, the power unit subsystem 106 notifies the memory subsystem 110 to stop flushing upon receiving further notification that the power button 130 has been released prior to the expiration of the full power button cycle duration, e.g., prior to the expiration of the full ten second timeout value (but after the expiration of the initial time out value of two seconds which triggered the flushing operation). In that case, further flushing is not needed since the shutdown process has been abandoned.

Figure 2A:
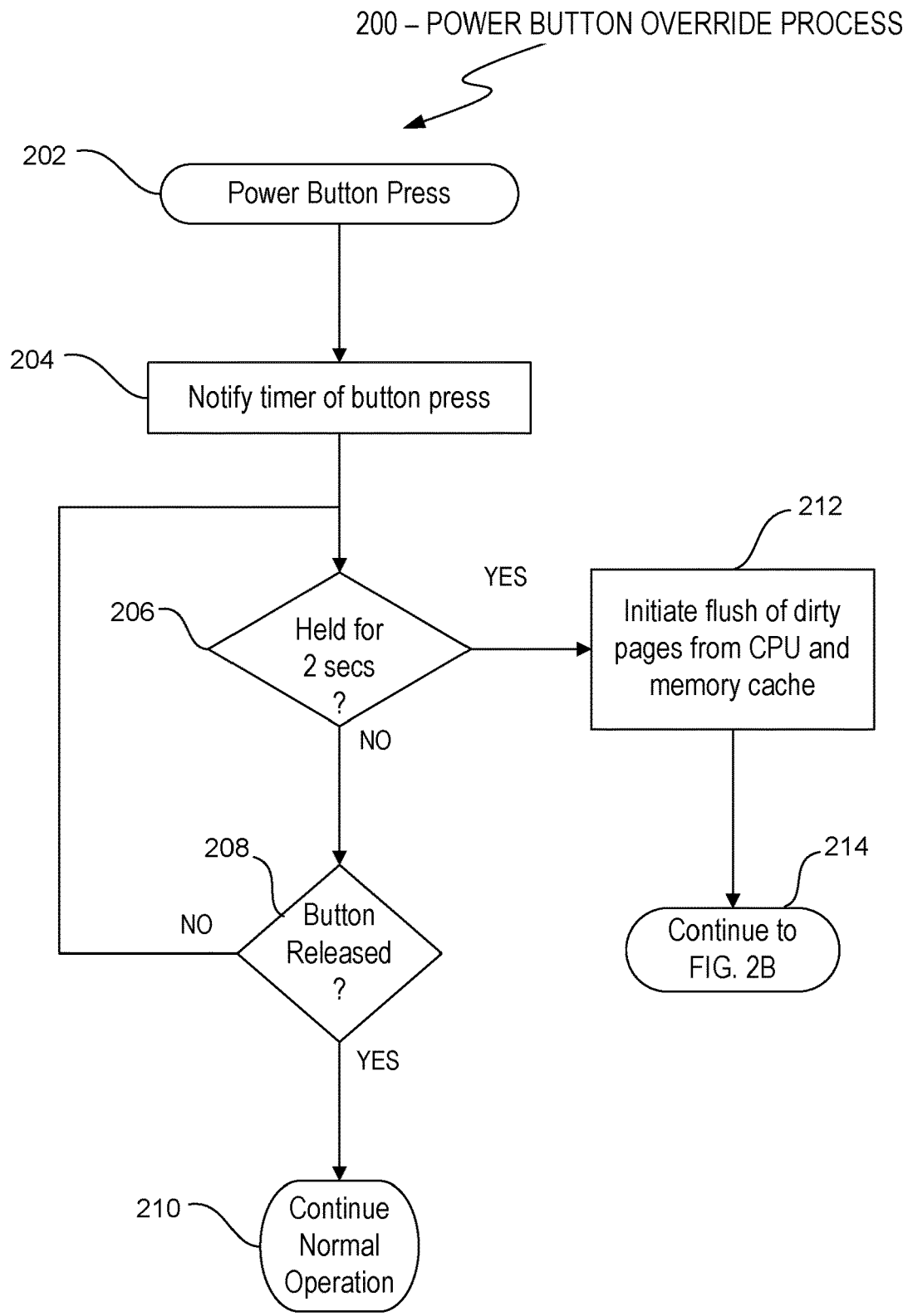
FIGS. 2A-2B are flow diagrams illustrating embodiments of processes performed for a power button override for persistent memory enabled platforms in accordance with various examples described herein.
Figure 2B:
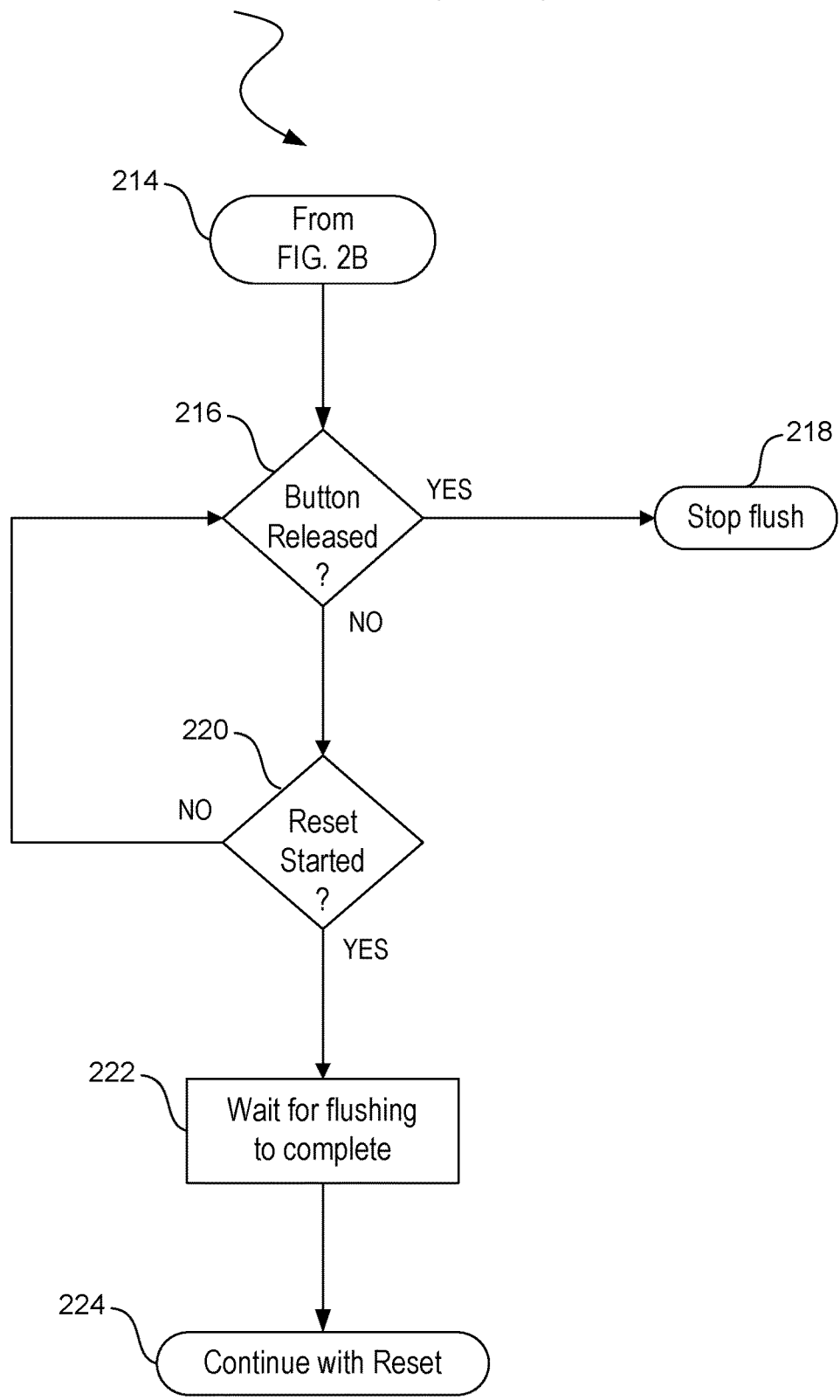

FIGS. 2A-2B are flow diagrams illustrating embodiments of processes 200 performed for a power button override for persistent memory enabled platforms in accordance with various examples described herein. With reference to FIG. 2A, at 202 a power button press is detected in a power button pin of a system with a persistent memory enabled platform. For example, in one embodiment, any one or more of the PWRBTN# pin 120 and the GPIO_X pin 122 detects the power button press 202. At 204 a notification of the power button press is sent to a power unit subsystem 106 or other subsystem of the CPU complex 104 in order to set a timer for monitoring a button state 108. At decision block 206, if the power unit subsystem 106 or other subsystem of the CPU complex 104 determines that an initial portion of the power button override cycle has elapsed, such as two elapsed seconds of a ten second cycle, then at 212 the memory subsystem 110 is notified to begin flushing data in the CPU complex 104 and volatile cache 114 to persistent memory 112, and the power button override process 200 continues at 214 as detailed below with reference to FIG. 2B.

In one embodiment, at decision block 208, if the power unit subsystem 106 or other subsystem of the CPU complex 104 determines that the power button override cycle has been interrupted prior to completion, e.g. the power button was released prior to the elapse of the initial two second period of the power button override cycle, then at 210 power button cycle override processes 200 terminate until the next time the power button is pressed.

With reference to FIG. 2B, after triggering the initiation of the flushing of dirty pages from the CPU complex 104 and/or the volatile cache 114, the power button override processes 200 continue at decision block 216 to monitor whether the power button was released prior to the end of the full power button cycle, e.g. after the initial two seconds but prior to the elapse of ten seconds. If the power button is released prior to the end of the full power button cycle, then the power unit subsystem 106 or other subsystem of the CPU complex 104 notifies the memory subsystem 110 to stop flushing data and any further power button override monitoring is terminated. If, however, the power button remains pressed until the expiration of the full power button cycle, e.g. for the full 10 seconds, then the power unit subsystem 106 or other subsystem of the CPU complex 104 waits for the flushing to be complete, such as occurs when the memory subsystem 110 confirms that flushing is complete. Upon confirmation that flushing is complete, at 224 the full CPU complex 104 continues with the shutdown process initiated when the power button was pressed.

Figure 3:
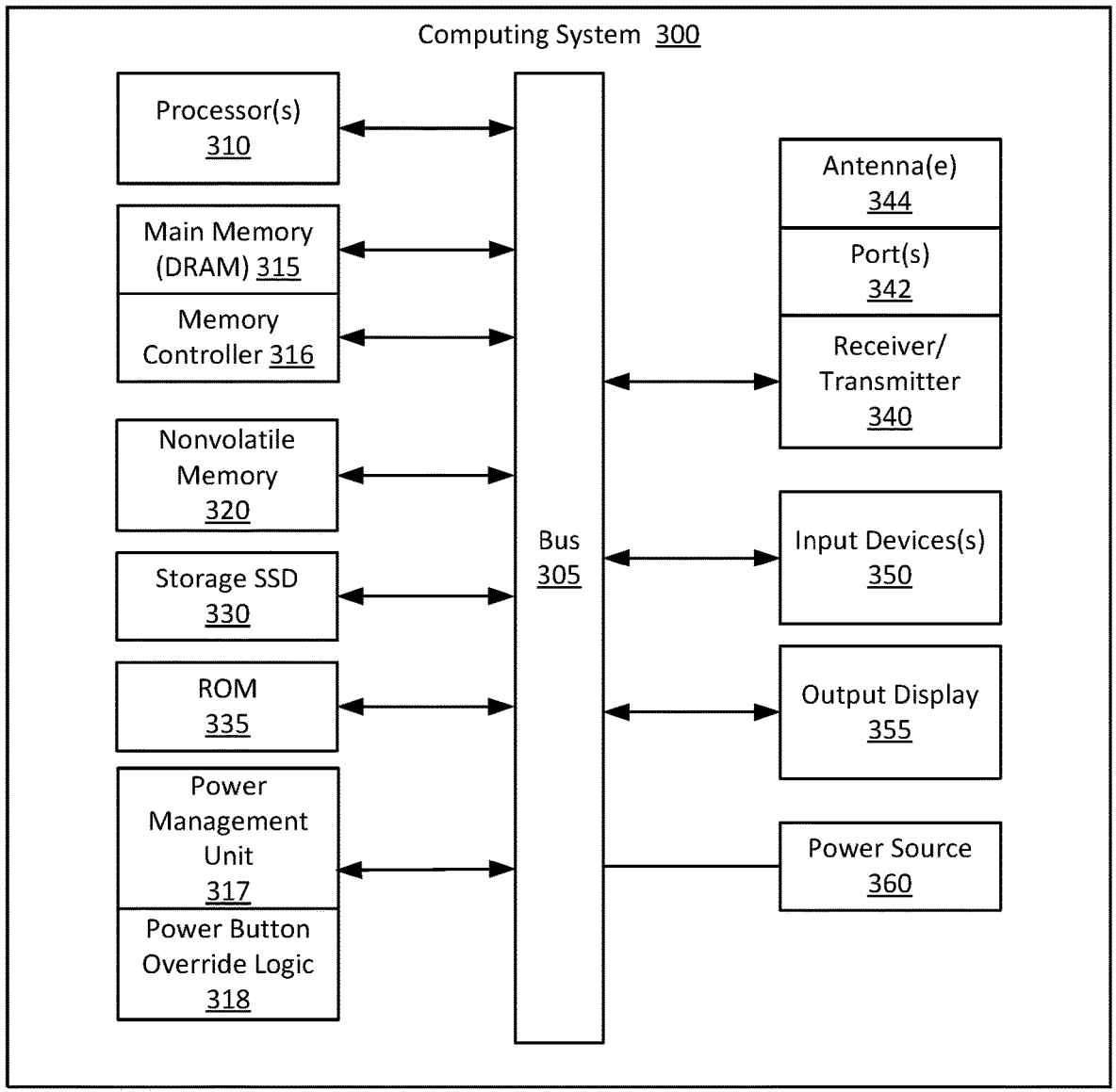
FIG. 3 illustrates an example of a typical computer system in which embodiments of processes for a power button override for persistent memory enabled platforms can be implemented, either in whole or in part, in accordance with various examples described herein.

FIG. 3 is an illustration of a computer system in which a power button override for persistent memory enabled platforms may be implemented in accordance with an embodiment. In this illustration, certain standard and well-known components that are not germane to the present description are not shown. Elements shown as separate elements may be combined, including, for example, a SoC (System on Chip) combining multiple elements on a single chip, where the single chip is an integrated circuit die.

In some embodiments, a computing system 300 may include a processing means such as one or more processors 310 coupled to one or more buses or interconnects, shown in general as bus 305. The processors 310 may comprise one or more physical processors and one or more logical processors. In some embodiments, the processors may include one or more general-purpose processors or special-purpose processors.

The bus 305 is a communication means for transmission of data. The bus 305 is illustrated as a single bus for simplicity but may represent multiple different interconnects or buses and the component connections to such interconnects or buses may vary. The bus 305 shown in FIG. 3 is an abstraction that represents any one or more separate physical buses, point-to-point connections, or both connected by appropriate bridges, adapters, or controllers.

In some embodiments, the computing system 300 further comprises a random access memory (RAM) or other dynamic storage device or element as a main memory 315 and memory controller 316 for storing information and instructions to be executed by the processors 310. Main memory 315 may include, but is not limited to, dynamic random access memory (DRAM).

In some embodiments, the computing system 300 includes a power-management unit 317 configured with a power button override logic 318 implementing the power button override processes for persistent memory enabled platforms as described herein with reference to FIGS. 1 and 2A-2B.

The computing system 300 also may comprise a non-volatile memory 320; a storage device such as a solid-state drive (SSD) 330; and a read only memory (ROM) 335 or other static storage device for storing static information and instructions for the processors 310.

In some embodiments, the computing system 300 includes one or more transmitters or receivers 340 coupled to the bus 305. In some embodiments, the computing system 300 may include one or more antennae 344, such as dipole or monopole antennae, for the transmission and reception of data via wireless communication using a wireless transmitter, receiver, or both, and one or more ports 342 for the transmission and reception of data via wired communications. Wireless communication includes, but is not limited to, Wi-Fi, Bluetooth™, near field communication, and other wireless communication standards.

In some embodiments, computing system 300 includes one or more input devices 350 for the input of data, including hard and soft buttons, a joy stick, a mouse or other pointing device, a keyboard, voice command system, or gesture recognition system.

In some embodiments, computing system 300 includes an output display 355, where the output display 355 may include a liquid crystal display (LCD) or any other display technology, for displaying information or content to a user. In some environments, the output display 355 may include a touch-screen that is also utilized as at least a part of an input device 350. Output display 355 may further include audio output, including one or more speakers, audio output jacks, or other audio, and other output to the user.

The computing system 300 may also comprise a battery or other power source 360, which may include a solar cell, a fuel cell, a charged capacitor, near field inductive coupling, or other system or device for providing or generating power in the computing system 300. The power provided by the power source 360 may be distributed as required to elements of the computing system 300.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 315 or the non-volatile memory 320 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

An example method, system, apparatus or computer-readable medium can be implemented in a processor coupled to a memory subsystem including a persistent memory, where the processor detects that a power button for shutting down the processor has been activated and monitors the activated power button to preserve data to the persistent memory prior to shutting down.

In another example implementation, monitoring further comprises setting a power button state and a power button override timer, and monitoring the power button state based on the power button override timer to override shutting down the processor until data is preserved to the persistent memory.

In another example implementation, detecting that the power button for shutting down the processor has been activated includes receiving a notification from a controller coupled to the processor that a pin for detecting the power button has been any one of activated and deactivated, wherein an activated pin results from a power button press and a deactivated pin results from a power button release, and monitoring the power button state based on the power button override timer includes monitoring the power button state for a duration of the power button override timer, and preserving data to the persistent memory includes notifying the memory subsystem to initiate flushing data from a volatile cache managed by the memory subsystem to the persistent memory upon expiration of a portion of the duration of the power button override timer, and overriding shutting down the processor until data is flushed to the persistent memory.

In another example implementation, the notification from the controller that the pin for detecting the power button has been activated is a hardware (HW) notification.

In another example implementation, the pin for detecting the power button is a general purpose input output (GPIO) pin coupled to the power button, the GPIO pin capable of generating the HW notification that the pin for detecting the power button has been any of activated and deactivated.

In another example implementation, the memory subsystem receives an interrupt from an operating system (OS) coupled to the processor and the OS interrupt causes the memory system to initiate flushing OS data to persistent memory, the OS interrupt having been generated responsive to a separate notification that the power button has been activated.

In another example implementation, the processor and controller are integrated in a system on a chip (SoC).

In the foregoing specification, embodiments have been described with reference to specific exemplary embodiments. It will be evident that various modifications could be made to the described embodiments without departing from the broader spirit and scope of the embodiments as set forth in the following claims. The specification and drawings are, accordingly, to be regarded in an illustrative sense rather than a restrictive sense.

What is claimed is:

1. An apparatus comprising:
a processor coupled to an operating system (OS) and to a memory subsystem including a persistent memory;
a controller coupled to the processor, the controller having at least one pin for detecting a power button to shut down the processor, the at least one pin including a general purpose input output (GPIO) pin coupled to the power button, the GPIO pin capable of generating a notification that the power button has been any of activated and deactivated, including a hardware notification, wherein an activated pin results from a power button press and a deactivated pin results from a power button release;
responsive to having received from the controller a separate notification that the power button has been activated, the OS is to cause the memory subsystem to initiate a pending requests flush of any OS pending requests to persistent memory; and
responsive to having received the notification from the controller that the pin for detecting the power button has been any of activated and deactivated, the processor is to monitor the power button to preserve data in the persistent memory prior to shutting down the processor, including to override the power button to shut down the processor until the data is preserved in the persistent memory.

2. The apparatus of claim 1, wherein the memory subsystem includes a volatile cache, and to preserve the data in the persistent memory the processor is further to:
set a power button state and a timer having a duration;
monitor the power button state for the duration of the timer; and
notify the memory subsystem to initiate a data flush of data from the volatile cache to the persistent memory upon expiration of a portion of the duration of the timer.

3. The apparatus of claim 1, wherein the processor and controller are integrated in a system on a chip (SoC).

4. A computer-implemented method comprising:
in a processor coupled to an operating system (OS) and a memory subsystem including a persistent memory:
detecting that a power button for shutting down the processor has been activated, including receiving a notification from a controller coupled to the processor that a pin for detecting the power button has been any one of activated and deactivated, wherein:
an activated pin results from a power button press and a deactivated pin results from a power button release,
the notification includes a hardware (HW) notification, and
the pin for detecting the power button is a general purpose input output (GPIO) pin coupled to the power button, the GPIO pin capable of generating the HW notification;
receiving in the memory subsystem an interrupt from an operating system (OS) coupled to the processor, the OS interrupt causing the memory subsystem to initiate flushing OS data to persistent memory, the OS interrupt having been generated responsive to a separate notification that the power button has been activated; and
monitoring the activated power button to preserve data to the persistent memory prior to shutting down the processor.

5. The computer-implemented method of claim 4, wherein monitoring further comprises:
setting a power button state and a power button override timer; and
monitoring the power button state based on the power button override timer to override shutting down the processor until data is preserved to the persistent memory.

6. The computer-implemented method of claim 5, wherein:
monitoring the power button state based on the power button override timer includes monitoring the power button state for a duration of the power button override timer; and
preserving data to the persistent memory includes:
notifying the memory subsystem to initiate flushing data from a volatile cache managed by the memory subsystem to the persistent memory upon expiration of a portion of the duration of the power button override timer, and
overriding shutting down the processor until data is flushed to the persistent memory.

7. A system comprising:
a central processing unit (CPU) coupled to a power unit subsystem, an operating system (OS) and a memory subsystem, the memory subsystem to manage a persistent memory;
a power button to shut down the CPU;
a platform controller hub (PCH) coupled to the CPU, the PCH having at least one pin for detecting whether the power button has been activated for shutting down the CPU;
the power unit subsystem to receive a notification, the notification including a hardware (HW) notification, from the PCH that the at least one pin for detecting the power button has been any one of activated and deactivated, an activated pin resulting from a power button press and a deactivated pin resulting from a power button release, wherein the at least one pin is a general purpose input output (GPIO) pin integrated into the PCH, the GPIO pin capable of detecting that the power button has been any of activated and deactivated and generating the HW notification;
responsive to the OS having received a separate notification from the PCH that the pin for detecting the power button has been activated, the memory subsystem to initiate flushing any OS pending requests in the memory subsystem to persistent memory; and
the power unit subsystem further to monitor the power button to preserve data to persistent memory prior to shutting down the CPU.

8. The system of claim 7, wherein the power unit subsystem is to further monitor the power button to override shutting down the CPU until data is preserved to persistent memory.

9. The system of claim 7, wherein to preserve data to persistent memory, the power unit subsystem is to:

set a power button state and a timer having a duration;
monitor the power button state for the duration of the timer; and
notify the memory subsystem to initiate flushing data from a volatile cache on the CPU to the persistent memory upon expiration of a portion of the duration of the timer.

10. The system of claim 7, wherein the CPU is a CPU complex and the power unit subsystem is a power management controller in the CPU complex, wherein the CPU complex and PCH are integrated into a system on a chip (SoC).

* * * * *